United States Patent
Akers et al.

(10) Patent No.: US 11,551,518 B2
(45) Date of Patent: Jan. 10, 2023

(54) CARD ADVANTAGE TRACKING SYSTEMS AND METHODS

(71) Applicants: Christopher Akers, Cincinnati, OH (US); Kevin Hillman, Burlington, KY (US); Wendell Hunsucker, Cincinnati, OH (US)

(72) Inventors: Christopher Akers, Cincinnati, OH (US); Kevin Hillman, Burlington, KY (US); Wendell Hunsucker, Cincinnati, OH (US)

( * ) Notice: Subject to any disclaimer, the term of this patent is extended or adjusted under 35 U.S.C. 154(b) by 0 days.

(21) Appl. No.: 17/412,954

(22) Filed: Aug. 26, 2021

(65) Prior Publication Data
US 2022/0068085 A1    Mar. 3, 2022

Related U.S. Application Data
(60) Provisional application No. 63/070,901, filed on Aug. 27, 2020.

(51) Int. Cl.
*G07F 17/32* (2006.01)
*G06N 3/08* (2006.01)
(Continued)

(52) U.S. Cl.
CPC ............ *G07F 17/3239* (2013.01); *A63F 1/14* (2013.01); *G06N 3/084* (2013.01); *G06V 40/172* (2022.01); *G07F 17/3293* (2013.01)

(58) Field of Classification Search
CPC .... G07F 17/3239; G07F 17/3293; A63F 1/14; G06N 3/084; G06V 40/172
See application file for complete search history.

(56) References Cited

U.S. PATENT DOCUMENTS

| 5,722,893 A | * | 3/1998 | Hill | ......................... A63F 1/14 463/47 |
| 6,039,650 A |   | 3/2000 | Hill | |

(Continued)

FOREIGN PATENT DOCUMENTS

WO    2019068141 A1    4/2019

OTHER PUBLICATIONS

International Searching Authority, International Search Report and Written Opinion, PCT/US2021/047875, dated Dec. 21, 2021, 11 pgs.

(Continued)

*Primary Examiner* — Kevin Y Kim
(74) *Attorney, Agent, or Firm* — Dinsmore & Shohl LLP

(57) ABSTRACT

An advantage player identification and tracking system includes card shoes configured to dispense playing cards and output card information of the dispensed playing cards, cameras positioned to capture image data of one or more players playing a card game, and a computing device communicatively coupled to the card shoes and the cameras. The computing device is configured to receive the card information from the card shoes, track, for a plurality of hands of cards dealt, game play and bets laid by the one or more players playing the card game, determine a card count, analyze, utilizing a machine learning model, the game play and the bets laid by the one or more players and card counts associated with the game play and the bets laid, and predict, utilizing the machine learning model, that a player of the one or more players is an advantage player.

20 Claims, 5 Drawing Sheets

(51) Int. Cl.
  *A63F 1/14*   (2006.01)
  *G06V 40/16*  (2022.01)

(56) References Cited

U.S. PATENT DOCUMENTS

| | | |
|---|---|---|
| 7,699,694 B2 | 4/2010 | Hill |
| 10,417,874 B2 | 9/2019 | Valentino, III et al. |
| 2002/0072405 A1 | 6/2002 | Soltys et al. |
| 2006/0252521 A1 | 11/2006 | Gururajan et al. |
| 2010/0279765 A9 | 11/2010 | Walker et al. |
| 2015/0238866 A1* | 8/2015 | Khabazian .............. A63F 13/75 463/7 |
| 2017/0069159 A1 | 3/2017 | Vikranth et al. |
| 2020/0175805 A1* | 6/2020 | Nagata ................... H04N 5/247 |

OTHER PUBLICATIONS

Yahoo! News, eConnect Countdown, Article, Feb. 25, 2013, 1 pg.

\* cited by examiner

CARD ADVANTAGE TRACKING SYSTEMS AND METHODS

CROSS-REFERENCE TO RELATED APPLICATIONS

This application clams the benefit of U.S. Provisional Application No. 63/070,901, filed Aug. 27, 2020, the contents of which are hereby incorporated by reference in their respective entirety.

TECHNICAL FIELD

The present specification generally relates to systems and methods for predicting and tracking advantage card players.

BACKGROUND

Card dispensing shoes may be used to dispense cards in card games such as 21 or Blackjack, Baccarat, Carribean Stud, Let It Ride, and Poker. The shoe is placed near a dealer's station on a card game table, and at least one deck of cards is placed in an opening at the shoe top during the play of a particular card game. Cards are placed face down in the shoe, and only the back side of the top card in the deck is observable while the cards are in the shoe. The dealer feeds cards for delivery to players at the table by manually engaging and forcing the top card of the deck through a card outlet at the front of the shoe. The dealer pulls the top card from the deck and it is delivered or dealt to a game player or game hand. A series of cards is thus delivered, one-by-one, to the players at the card game table until each player or game hand has the requisite number of cards for playing the game. The shoe remains in view of the dealer and game players, and, absent cheating, neither dealer nor any player is aware of any of the cards value.

Card dispensing shoes may be equipped with imaging devices or related sensing components that are configured to identify the color, suit, and value of a card that is dispensed. Card dispensing shoes include or may be communicatively coupled to a computing device that receives the identified card and implements one of many card counting methods to determine a card count. Embodiments of the present disclosure utilize information attained by the card dispensing shoe along with other inputs to unlock numerous analytic capabilities leading to the tracking, identification, and notification of advantage players.

SUMMARY

Embodiments of the present disclosure include advantage player identification and tracking systems. An advantage player identification and tracking system includes one or more card shoes configured to dispense playing cards and output card information of the dispensed playing cards, one or more cameras positioned to capture image data of one or more players playing a card game, and a computing device communicatively coupled to the one or more card shoes and the one or more cameras. The computing device is configured to receive the card information from the one or more card shoes, track, for a plurality of hands of cards dealt, game play and bets laid by the one or more players playing the card game, determine a card count associated with each of the plurality of hands of cards dealt, analyze, utilizing a machine learning model, the game play and the bets laid by the one or more players and card counts associated with the game play and the bets laid by the one or more players, where the machine learning model is trained to predict the presence of advantage play strategies based on game play strategies, bet behaviors, and associated card count, and predict, utilizing the machine learning model, that a player of the one or more players is an advantage player implementing an advantage play strategy based on the analysis of the game play, the bets laid, and the card counts.

Embodiments of the present disclosure also include methods of identifying and tracking an advantage player. A method for identifying and tracking an advantage player includes receiving a card information from one or more card shoes, wherein the one or more card shoes are configured to dispense playing cards and output the card information of the dispensed playing cards and receiving image data from one or more cameras positioned to capture image data of one or more players playing a card game. The method further includes tracking, with a computing device for a plurality of hands of cards dealt, game play and bets laid by the one or more players playing the card game, determining a card count associated with each of the plurality of hands of cards dealt, analyzing, utilizing a machine learning model, the game play and the bets laid by the one or more players and card counts associated with the game play and the bets laid by the one or more players, wherein the machine learning model is trained to predict the presence of advantage play strategies based on game play strategies, bet behaviors, and associated card count, and predicting, utilizing the machine learning model, that a player of the one or more players is an advantage player implementing an advantage play strategy based on the analysis of the game play, the bets laid, and the card counts.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure include systems and methods for tracking advantage card players. In particular, the systems and methods of the present disclosure unlock the full potential of a card count tracking and dispensing shoe by automating the process of identifying advantage players. The mere knowledge of a card count for a particular game in progress may provide a casino and/or their security with the ability to attempt to identify a player taking advantage of the count (referred to herein as an "advantage player"). However, current processes require personnel to track players' behavior over a number of deals. Complications to the manual process of identifying an advantage player arise in part due to the sheer volume of players, tables, variety of games and different counting methods employed by advantage players in their attempts to beat the house using card counting and corresponding betting methods. For example, casino floors include many tables setup for a variety of card games. Each of the tables host many players, thus requiring a pit boss, dealer, or other personnel to track the betting behavior, bet amounts, game play, card count, and the like of several players over the course of many hands in an attempt to identify an advantage player.

The systems and methods described herein improve the ability to identify and track advantage players by automating the collection and analysis of betting behaviors, bet amounts, game play, card counts and the like of one or more players over the course of many hands. Through data and predictive analytics, machine learning models, and the like, a pit boss, dealer, or other personnel may identify and track advantage players throughout an entire casino and across many games with improved precision and less human effort and training than through manual methods.

Embodiments herein include systems and methods of determining an advantage player by utilizing a combination of variance in game play and variance in betting behavior along with a relative bet value to the card count. Some embodiments include systems and methods for predicting whether an advantage player is detrimental to an establishment based on a predicted win/loss percentage for the player over time, optionally, across various games within the establishment. Yet some embodiments include systems and methods for identifying a player based on game play and/or betting behavior. Some methods of identifying a player may also include using biometrics such as facial recognition based on images captured by cameras throughout the casino.

These and additional features implemented by the embodiments described herein will be more fully understood in view of the following detailed description, in conjunction with the drawings.

Figure 1:
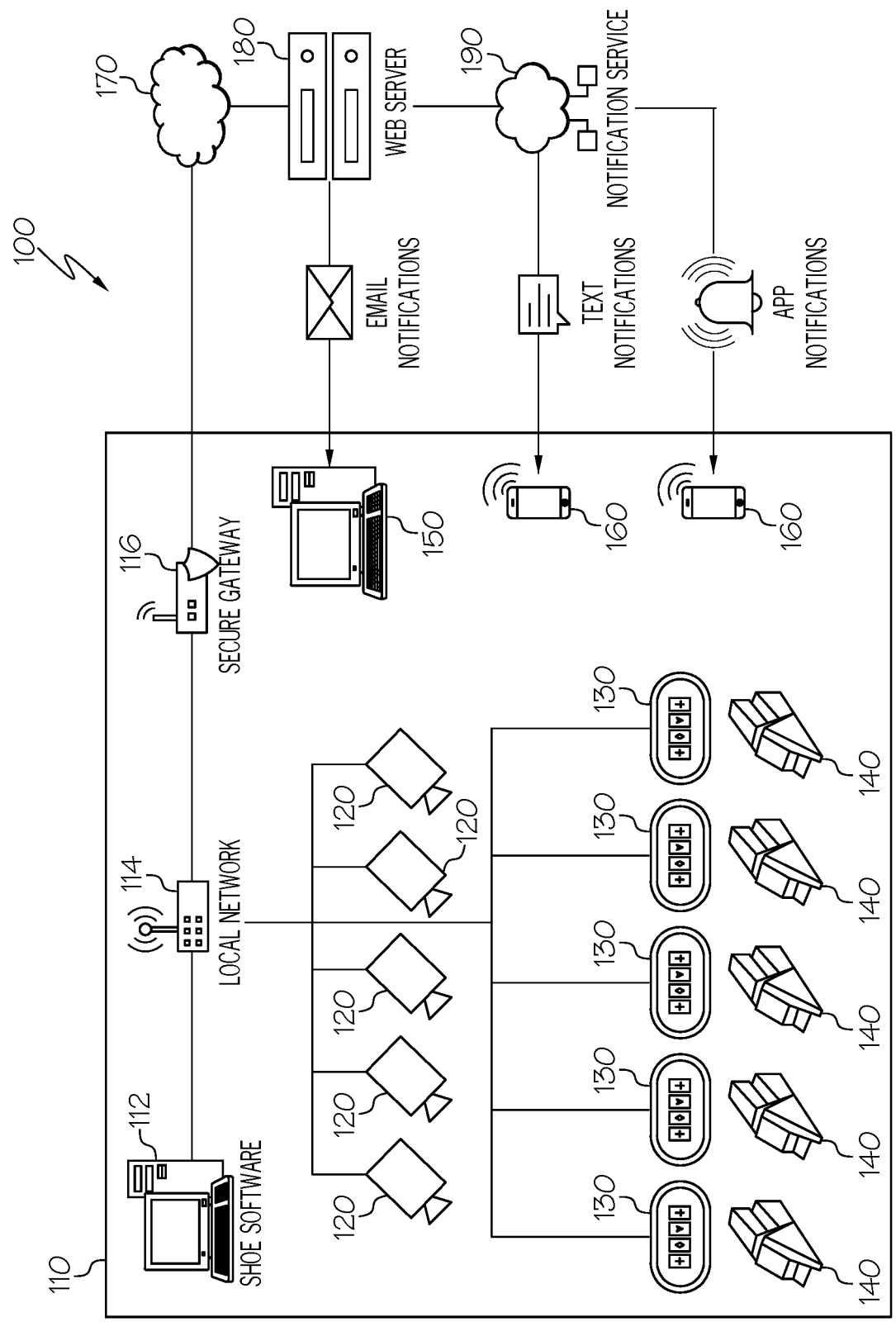
FIG. 1 depicts an illustrative system that identifies and tracks advantage players by automatically collecting and analyzing betting behaviors, bet amounts, game play, card counts and the like of one or more players over the course of many hands, according to one or more embodiments shown and described herein.

Referring now to the drawings, FIG. 1 depicts an illustrative system 100 that identifies and tracks advantage players by automatically collecting and analyzing betting behaviors, bet amounts, game play, card counts and the like of one or more players over the course of many hands. The system 100 depicted in FIG. 1 is merely an example system. It should be understood that the system 100 may include more or less components. The system 100 may include a local system 110 that interfaces local components communicatively coupled to a network 170 and one or more remote components (e.g., a web server 180 and notification service 190 such as a telecommunication infrastructure). The local system 110 may be a system deployed in a casino or other facility. The local system 110 may include a computing device 112, a local network 114, a secure gateway 116, one or more cameras 120, one or more game tables 130, and one or more card shoes 140.

Figure 2:
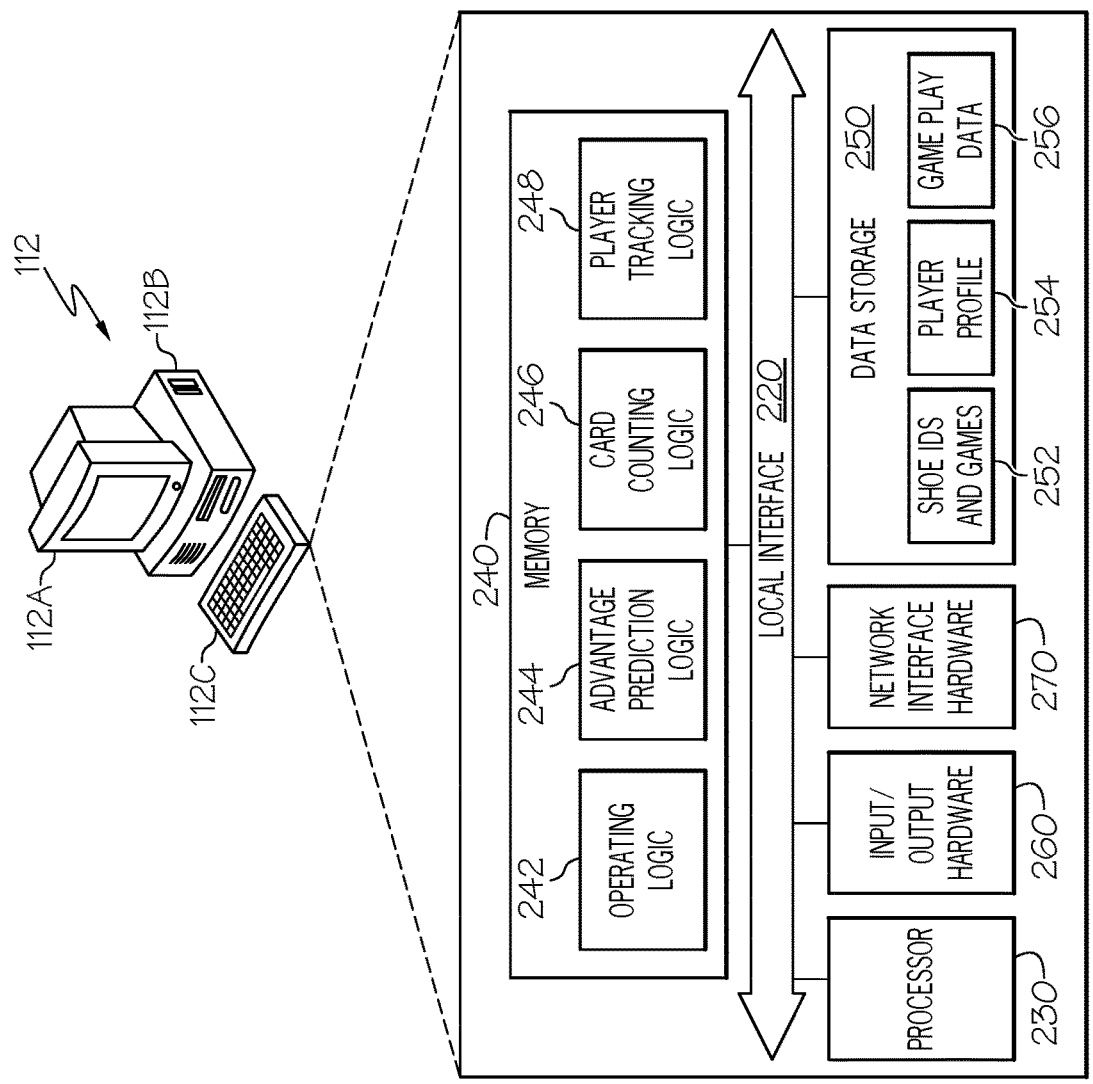
FIG. 2 depicts an illustrative computing device implemented in the system, according to one or more embodiments shown and described herein.

The computing device 112 may include a display device 12A (FIG. 2), a processing unit 12B (FIG. 2) and an input device 12C (FIG. 2), each of which may be communicatively coupled together and/or to the local network 114 and further various components of the local system 110 including but not limited to the one or more camera 120, the one or more game tables 130, and the one or more card shoes 140. The computing device 112, which is described in more detail with reference to FIG. 2, is configured to perform one or more processes described herein. For example, the computing device 112 may receive image data from the one or more cameras 120, game play information from the one or more game tables 130, and/or dealt card identification for example in the form of an image of a card being dealt from the one or more card shoes 140. The computing device 112 may analyze the image data from the one or more cameras to determine the identification of players at a game table. The computing device 112 may further be configured to track the game play and betting strategies and values implemented by the players at a game table. Additionally, the computing device 112 may receive card image data from the card shoe and in response determine one or more different counts for a particular game being played at the game table.

The computing device 112, the one or more cameras 120, the one or more game tables 130, and the one or more card shoes 140 are each communicatively coupled together via local network 114. The local network 114 may implement a wide area network, such as the internet, a local area network (LAN), a mobile communications network, a public service telephone network (PSTN) and/or other network. The local network 114 may be a wireless or wired switch, router, gateway, server, or the like. In some embodiments, the local system 110 may implement a secure gateway 116 that manages access to the local system 110 from remote devices and networks 170.

The system 100 further includes one or more cameras 120. The one or more cameras 120 may be security cameras mounted in various locations around a casino or similar facility. In some embodiments, one or more cameras 120 may be configured to view players at a game table or moving about between the one or more game tables 130. The one or more cameras 120 may be any device having an array of sensing devices (e.g., pixels) capable of detecting radiation in an ultraviolet wavelength band, a visible light wavelength band, or an infrared wavelength band. The one or more cameras 120 may have any resolution. The one or more cameras 120 may be an omni-directional camera, or a panoramic camera. In some embodiments, one or more optical components, such as a mirror, fish-eye lens, or any other type of lens may be optically coupled to the one or more cameras 120. In embodiments described herein, the one or more cameras 120 may provide image data of a player or the game table and the environment around the player to the computing device 112.

The one or more game tables 130 may include the one or more card shoes 140. The one or more game tables 130 may also be game tables equipped with cameras and/or other sensors that can track game play such as what cards are played, how a player plays the cards that are dealt to them (e.g., stays, splits, folds, doubles down, or the like), bets that are made or not made, and the like. That is, the one or more game tables 130 are equipped with electronics that are in communication with the computing device 112. The game tables 130 may include wireless electronic readers capable of tracking betting chips on or near the surface of the game table 130. Tracking the betting chips enables the system 100 to determine bets laid and chip values available for a player to bet with. This information may be utilized, as described herein, to determine betting behavior of a player.

The one or more card shoes 140 may be any card dispensing unit that includes a camera or other sensor configured to capture an image of each card that is dispensed and/or determine the card color, value, and suit. The determination of the card color, value, and suit may be determined by the computing device 112. In some embodiments, image data of a card may be input to a neural network 400 to determine the dealt card's information 350 (FIG. 3) including the card's value, card's color, and card's suit. Operation of the system 100 will be described in more detail herein.

Still referring to FIG. 1, the system 100 may include a terminal computing device 150. The terminal computing device 150 may be any computing device that is connected to a network and capable of receiving notifications such as emails or other data. The terminal computing device 150 may be configured to enable a user to interface with the local system 110 and receive information regarding past and present player data, game history, bet history or the like. The terminal computing device 150 may be utilized by casino personnel or other users to track and identify players in the casino. When the system 100 identifies an advantage player, a web server 180 and/or notification server 190 may generate an email notification, a text notification, or trigger a notification through an application installed on the terminal computing device 150, a smartphone 160 or the like. Methods of identifying an advantage player will be described in more detail herein.

Turning to FIG. 2, an illustrative computing device 112 implemented in the system 100 is depicted. As disclosed above, the computing device 112 may include a display device 12A, a processing unit 12B, and an input device 12C, each of which may be communicatively coupled together and/or to the local network 114 and further various components of the local system 110 including but not limited to the one or more camera 120, the one or more game tables 130, and the one or more card shoes 140. More specifically, in some embodiments, any type of computing device (e.g., mobile computing device, personal computer, server, and the like) may be utilized for any of these components The computing device 112 may be used to determine card counts for a particular game based on data received from the one or more card shoes 140. The computing device 112 may also be used to process image data from the one or more cameras 120 to determine the identity of a player and/or track a player from game table to game table. In some embodiments, the image data may be used to track game play of one or more players. The computing device 112 is also configured to make predictions as to whether a player is an advantage player based on bets made, expected bet activity in view of past game play or bet behavior, game play strategy, card count, and the like. In some systems, the computing device 112 may identify a player based on the game play methods that they implement. The computing device 112 is configured to implement hardware, software, and/or firmware, according to embodiments shown and described herein. While in some embodiments, the computing device 14 may be configured as a general-purpose computer with the requisite hardware, software, and/or firmware, in some embodiments, the computing device 14 may be configured as a special purpose computer designed specifically for performing the functionality described herein.

As also illustrated in FIG. 2, the computing device 112 may include a local interface 220 communicatively connecting a processor 230, a memory component 240, a data storage component 250, input/output hardware 260, and network interface hardware 270. The local interface 220 may be implemented as a bus or other interface to facilitate communication among the components of the computing device 112.

The processor 230 may include any processing component(s) configured to receive and execute programming instructions (such as from the data storage component 250 and/or the memory component 240). The instructions may be in the form of a machine readable instruction set stored in the memory component 240 and/or the data storage component 250. The processor 230 may be an electric controller, an integrated circuit, a microchip, a computer, or any other computing device. The processor 230 is communicatively coupled to the other components of computing device 112 through the local interface 220 and/or the network interface hardware 270. Accordingly, the local interface 220 may communicatively couple any number of processors 230 with one another, and allow the components coupled to the local interface 220 to operate in a distributed computing environment. Specifically, each of the components may operate as a node that may send and/or receive data. Furthermore, while the embodiment depicted in FIG. 2 includes a single processor 230, some embodiments may include more than one processor 230.

The memory component 240 may be machine readable memory (which may also be referred to as a non-transitory processor readable memory). The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store the operating logic 242, the advantage prediction logic 244, the card counting logic 246, and the player tracking logic 248 (each of which may be embodied as a computer program, firmware, or hardware, as an example).

The operating logic 242 may include an operating system and/or other software for managing components of the computing device 112. The advantage prediction logic 244 is logic configured to compile and analyze bets made, expected bet activity in view of past game play or bet behavior, game play strategy, card count (e.g., a running count, true count, or other count), and the like to make a prediction as to whether a player is an advantage player. For example, a player implementing one of a variety of card counting methods may be identified through predictive analytics or machine learning models. The analysis and prediction of an advantage player may be made in real time regardless of the card counting method the player may be implementing. The prediction may also include a confidence interval indicating the likelihood that the player is an advantage player or just a player who is lucky. The advantage prediction logic 244 may account for the variance in play and variance in bets. The advantage prediction logic 244 may further implement a method that utilizes the relative bet amount to the card count to make a prediction as to whether a player is an advantage player. Unlike manually tracking one player at a time with another trained individual via a security footage or in person, the computing device 112 may compile and analyze data corresponding to tens, hundreds, or even thousands of players simultaneously each playing one of a variety of games.

The memory component 240 may also include card counting logic 246. The card counting logic 246 is logic (e.g., software) configured to analyze image data from the card shoes 140 to determine the card color, value, and suit. The card counting logic 246 may be configurable though a computing device 112 to implement one or more different card counting methods, select the game being played with the card shoe 140, and/or select the number of players currently playing at a game table. Other parameters may be configured and/or tracked. For example, the card counting logic 246 may also implement hand to hand and/or game to game card counts, ace tracking, or the like. The card counting logic 246 may also cause the card count to be displayed in real time on the computing device 112, a terminal computing device 150, a smartphone 160, or the like.

The memory component 240 may also include player tracking logic 248. The player tracking logic 248 is logic (e.g., software) configured to identify a player, track a player during game play and between game tables, and develop a player profile 254 for the player. The player tracking logic 248 may utilize card counts determined by the card counting logic 246 to access and track the average number of hands dealt per hour or shoe dealt per hour. This enables the system to pinpoint dealers that are not meeting hands per hour requirements and permit better staff scheduling based on actual business needs and not just perceived needs. Improving play efficiencies is also a benefit of the present disclosure by utilizing similar parameters and methods that are used to track players.

Another feature of player tracking logic 248 is that although a player may be identified as an advantage player, a casino may utilize the players profile and determine the players overall impact on the casino. The player may be an advantage player at one game table but a historical loser at other game tables. Since these features are tracked then a casino is able to make a more informed decision on how to handle the advantage player.

Still referring to FIG. 2, the data storage component 250 may reside local to and/or remote from the computing device 112 and may be configured to store one or more pieces of data for access by the computing device 112 and/or other components. As illustrated in FIG. 2, the data storage component 250 may store the card shoe IDs 252 and types of games that use the particular card shoes. This card shoe IDs are used for configuring the card shoes and looking up present or past activity. The data storage component 250 may also store player profiles 254. When a player is identified by the player tracking logic 248, a player profile 254 is created for that player so that the player may be tracked from hand to hand, game to game, and/or visit to visit. Some of the information tracked on a player may include play behavior, bet behavior, overall win/loss rates and/or total money won and loss, and the like. The data storage component 250 also includes game play data 256. Game play data 256 may include bet history, dealt card history, card count history, and the like.

The input/output hardware 260 may include a monitor, keyboard, mouse, printer, camera, microphone, speaker, and/or other device for receiving, sending, and/or presenting data. The network interface hardware 270 may include any wired or wireless networking hardware, such as a modem, LAN port, Wi-Fi card, WiMAX card, mobile communications hardware, and/or other hardware for communicating with other networks and/or devices.

It should also be understood that the components illustrated in FIG. 2 are merely exemplary and are not intended to limit the scope of this disclosure. More specifically, while the components in FIG. 2 are illustrated as residing within the computing device 112, this is merely an example. In some embodiments, one or more of the components may reside external to the computing device 112.

Figure 3:
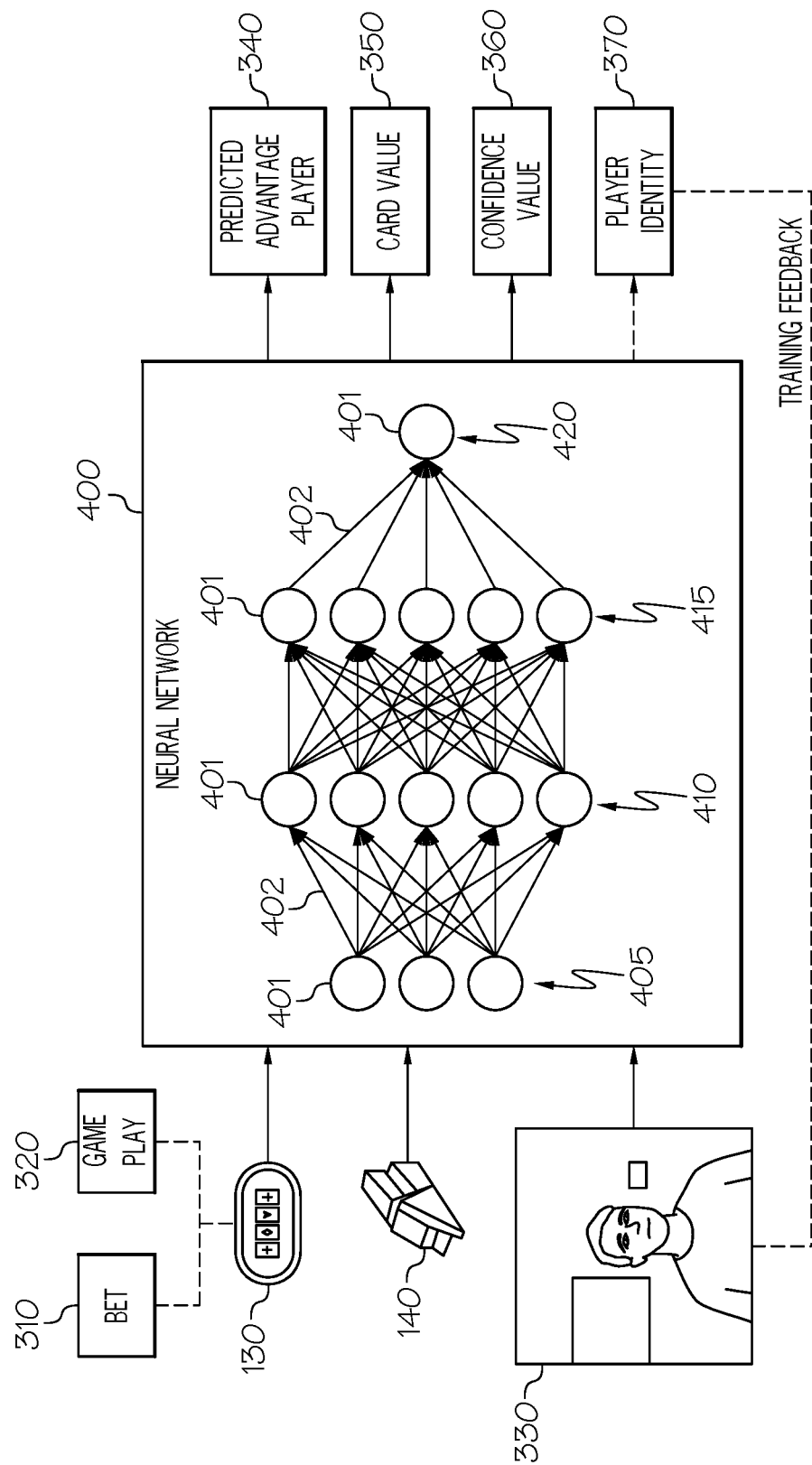
FIG. 3 depicts an illustrative diagram of a neural network for predicting the presence of an advantage player, determining a card value, card color, card suit, a confidence interval, and/or a player identity, according to one or more embodiments shown and described herein.

Referring now to FIG. 3, an illustrative diagram for training a neural network 400 and a neural network 400 is depicted. While a neural network 400 type of machine learning model is depicted and described in detail herein, it should be understood that various other types of machine learning models may be utilized to accomplish the same tasks of analyzing data and predicting the presence of advantage play through advantage play strategies.

One or more neural networks 400 may be configured for the purposes of predicting the presence of an advantage player 340, determining a dealt card's information 350 including the card's value, card's color, and card's suit, a confidence value 360, and/or a player identity 370. While the neural network 400 is depicted as outputting each of the aforementioned outputs, it should be understood that some neural network 400 implementations may be configured to generate one or more of the outputs. In some embodiments, separate neural networks 400 may be implemented to generate each output or a set of outputs. The outputs may be generated from a number of inputs including for example, bet information 310, game play information 320, and the like via the game table 130. Other inputs may include inputs from a card shoe 140 and/or image data 330 from the one or more of the cameras 120. The image data 330 may include a headshot of a player which may be used in a facial recognition configured neural network 400 to determine the identity of the player.

In some embodiments, the neural network 400 may include one or more layers 405, 410, 415, 420, having one or more nodes 401, connected by node connections 402. The one or more layers 405, 410, 415, 420 may include an input layer 405, one or more hidden layers 410, 415, and an output layer 420. The input layer 405 represents the raw information that is fed into the neural network 400. For example, bet information 310, game play information 320, inputs from a card shoe 140 and/or image data 330 may be input into the neural network 400 at the input layer 405. The neural network 400 processes the raw information received at the input layer 405 through nodes 401 and node connections 402. The one or more hidden layers 410, 415, depending on the inputs from the input layer 405 and the weights on the node connections 402, carry out computational activities. In other words, the hidden layers 410, 415 perform computations and transfer information from the input layer 405 to the output layer 420 through their associated nodes 401 and node connections 402.

In general, when a neural network is learning, the neural network is identifying and determining patterns within the raw information received at the input layer 405. In response, one or more parameters, for example, weights associated to node connections 402 between nodes 401, may be adjusted through a process known as back-propagation. It should be understood that there are various processes in which learning may occur, however, two general learning processes include associative mapping and regularity detection. Associative mapping refers to a learning process where a neural network learns to produce a particular pattern on the set of inputs whenever another particular pattern is applied on the set of inputs. Regularity detection refers to a learning process where the neural network learns to respond to particular properties of the input patterns. Whereas in associative mapping the neural network stores the relationships among patterns, in regularity detection the response of each unit has a particular 'meaning'. This type of learning mechanism may be used for feature discovery and knowledge representation.

Neural networks possess knowledge which is contained in the values of the node connection weights. Modifying the knowledge stored in the network as a function of experience implies a learning rule for changing the values of the weights. Information is stored in a weight matrix W of a neural network. Learning is the determination of the weights. Following the way learning is performed, two major categories of neural networks can be distinguished: 1) fixed networks in which the weights cannot be changed (i.e., dW/dt=0) and 2) adaptive networks which are able to change their weights (i.e., dW/dt not=0). In fixed networks, the weights are fixed a priori according to the problem to solve.

In order to train a neural network to perform some task, adjustments to the weights are made in such a way that the error between the desired output and the actual output is reduced. This process may require that the neural network computes the error derivative of the weights (EW). In other words, it must calculate how the error changes as each weight is increased or decreased slightly. A back propagation algorithm is one method that is used for determining the EW.

The algorithm computes each EW by first computing the error derivative (EA), the rate at which the error changes as the activity level of a unit is changed. For output units, the EA is simply the difference between the actual and the desired output. To compute the EA for a hidden unit in the layer just before the output layer, first all the weights between that hidden unit and the output units to which it is connected are identified. Then, those weights are multiplied by the EAs of those output units and the products are added. This sum equals the EA for the chosen hidden unit. After calculating all the EAs in the hidden layer just before the output layer, in like fashion, the EAs for other layers may be computed, moving from layer to layer in a direction opposite to the way activities propagate through the neural network, hence "back propagation". Once the EA has been computed for a unit, it is straight forward to compute the EW for each incoming connection of the unit. The EW is the product of the EA and the activity through the incoming connection. It should be understood that this is only one method in which a neural network is trained to perform a task.

Referring back to FIG. 3, the neural network 400 may include one or more hidden layers 410, 415 that feed into one or more nodes 401 of an output layer 420. There may be one or more output layers 420 depending on the particular output the neural network 400 is configured to generate. For example, the neural network 400 may be trained to output a prediction as to whether a player is an advantage player 340, card's information 350, a confidence value 360 associated with the prediction 340, and/or a player identity 370.

Figure 4:
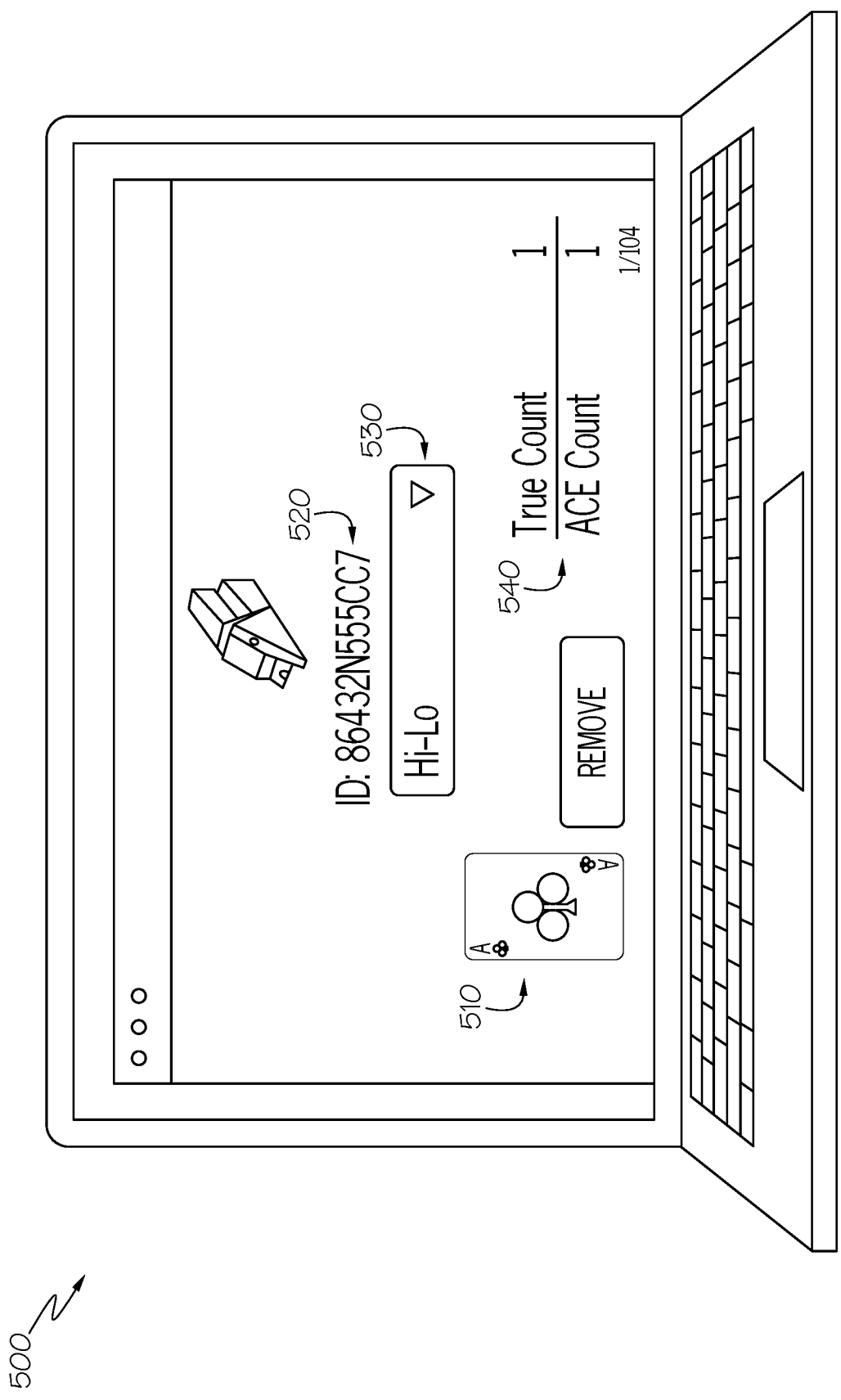
FIG. 4 depicts an illustrative user interface for configuring a card shoe, according to one or more embodiments shown and described herein.
Figure 5:
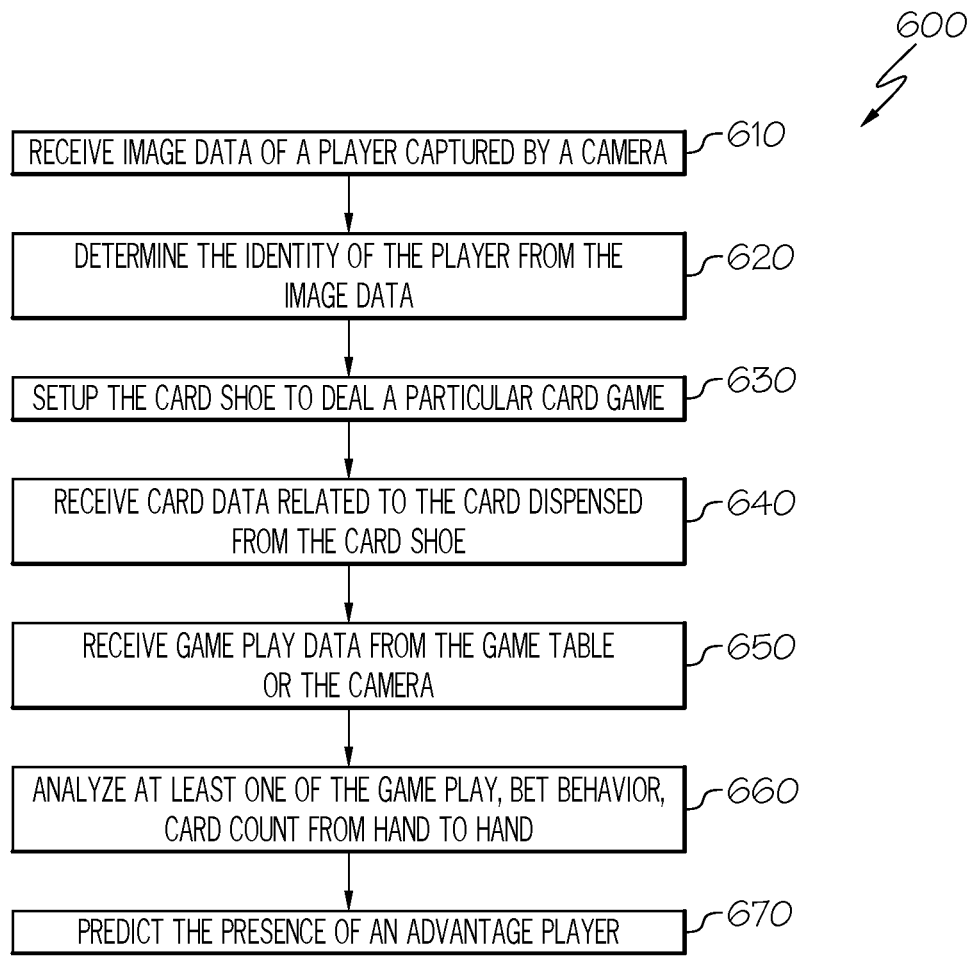
FIG. 5 depicts a flowchart of an example method of predicting the presence of an advantage player, according to one or more embodiments shown and described herein.

Turning to FIG. 4, an illustrative user interface 500 for configuring a card shoe is depicted. The user interface 500 may be displayed on a display 112B of a computing device 112 or another electronic device. The user interface 500 enables a user to configure a card shoe 140. For example, the user interface 500 displays an image 510 of the card just dispensed by the card shoe 140, an ID number 520 of the card shoe, and/or the count type or game 530 that the card shoe 140 is being used to play. The user interface 500 may also display one or more different card counts 540 or game play stats. It is understood that other user interface 500 configurations may be implemented. Some other examples include a player profile, bet and/or play history in the form of tables or graphs, Referring to FIG. 5, a flowchart 600 of an example method of predicting the presence of an advantage player, according to one or more embodiments shown and described herein is depicted. The method depicted in the flowchart is one example of predicting a presence of an advantage player that implements the system 100 described herein. The computing device 112 may implement one or more steps of the method depicted in flowchart 600. The flowchart 600 will now be described in detail with reference to aspects depicted and described in the aforementioned description and figures.

At block 610, the computing device 112, receives image data of one or more players captured by a camera 120. In some embodiments the computing device 112 may receive image data from a plurality of cameras positioned throughout gaming location such as a casino. The image data may capture images of players, images of game play, images of bets laid on a gaming table and the like. The image data may be video data or a still image. Based on the image data, the computing device 112, at block 620, determines the identity of the player. The computing device 112 may utilize facial recognition, a machine learning model such as a neural network, or other method of determining the identity of the player from the image data. Once a unique player identify is identified, a player profile may be created for that player and include biometrics unique to that player for tracking and identifying the player again through other image data. The computing device 112 may include software capable of tracking the location of a player from one set of image data received from one camera to a second set of image data received from another camera. Accordingly, the computing device 112 may track the player as he or she moves about a gaming location and plays at different game tables or other gambling machines.

At block 630, a user may setup the card shoe 140 to deal a particular game and/or track one or more predefined counts via the computing device 112. As described hereinabove, one or more card shoes 140 may be positioned at various game tables 130 throughout a gaming location. Each of the one or more card shoes 140 are configured to dispense cards and output card information to the computing device 112. Additionally, when the one or more card shoes 140 are actively being used for a card game, the card shoe 140 or the card information output thereby may be associated with the number of players currently playing the card game. That is, the card information for each card dispensed may be associated with a specific player playing the card game. For example, as cards are dispensed from the card shoe, at block 640, the computing device 112 receives card information related to the card dispensed from the card shoe 140. In some embodiments, the computing device 112 further receives game play data from the game table or the one or more cameras at block 650. Game play, as described herein, may include information such as what cards are played, how a player plays the cards that are dealt to them (e.g., stays, splits, folds, doubles down, or the like), what cards are dealt to other players or the dealer and the like. Game play information may be obtained from card information output by the one or more card shoes 140 and/or the image data captured by the one or more cameras and compiled by the computing device 112. In some embodiments, game play information may include the chip value of a player available to bet, the amount of the bets laid, and other betting information of the player through image data and/or electronic devices coupled to the game table 130. For example, some game tables 130 may include RFID or other wireless technology capable of reading and tracking betting chips on disposed on the surface or near the surface of the game table 130. That is, the betting chips may include RFID tags or other passive or active tags detectable by electronic readers. Based on the location of the betting chips, the electronic readers and/or image data from the one or more cameras, the computing device 112 may determine a value of bets laid, a value of the chips available by a player to bet, the proportional amount of the bets laid to the value of the chips available and the like. Over the course of one or more hands, the computing device 112, optionally with the assistance of a machine learning models, may develop a betting behavior for a player. The betting behavior may be associated with the game play and also the card counts at the time the bets were made and the cards dealt in successive hands to predict playing patterns that correspond advantage play strategies.

The computing device 112 may repeatedly receive card information, game play, and bets laid information from hand to hand meanwhile tracking one or more counts. At block 660, the computing device 112 analyzes the game play (e.g., bet behavior, card count, etc.) from hand to hand. The computing device 112 may utilize variances in play and variances in betting behavior to determine a player's betting behavior. For example, if the player's betting behavior corresponds to relative increases or decreases in card count and would be an informed play based on the game play of the competition at the game table (e.g., the cards dealt to the dealer and/or other players) the computing device 112, using a trained machine learning model to process and analyze the data, may predict a player is an advantage player at block 670. In some embodiments, the prediction includes a level of confidence that the prediction is accurate. As the confidence level of the prediction increases the likelihood that the player is an advantage player is more probable. When a confidence level of a prediction that a player is implementing an advantage play strategy reaches a predetermined threshold, a notification may be generated and transmitted to the gaming staff to take appropriate actions, if any. In some embodiments, the notification may be a wireless audio message, a text message, an email, and/or a display alert to security staff or a pit boss.

However, in some embodiments, when a player is predicted to be implemented an advantage play strategy, the system 100 may determine whether the player is currently detrimental to the gaming location. That is, the system 100 may track the amount the player is winning or losing and determine whether their current predicted advantage play activity is detrimental to the gaming location (e.g., winning more than acceptable). Accordingly, a notification of the presence of the advantage player may be delayed until the player exceeds a predefined amount of winnings. A player's winnings may be tracked in their player profile. Additionally, a player's winnings may include an analysis of their winnings or losses over their lifetime, over the past 30 days, over their current visit, or other time intervals.

The functional blocks and/or flowchart elements described herein may be translated onto machine-readable instructions or as a computer program product, which when executed by a computing device, causes the computing device to carry out the functions of the blocks. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Aspects of the present disclosure may include one or more card shoes configured to dispense playing cards and output card information of the dispensed playing cards, one or more cameras positioned to capture image data of one or more players playing a card game, and a computing device communicatively coupled to the one or more card shoes and the one or more cameras. The computing device is configured to receive the card information from the one or more card shoes, track, for a plurality of hands of cards dealt, game play and bets laid by the one or more players playing the card game, determine a card count associated with each of the plurality of hands of cards dealt, analyze, utilizing a machine learning model, the game play and the bets laid by the one or more players and card counts associated with the game play and the bets laid by the one or more players, where the machine learning model is trained to predict the presence of advantage play strategies based on game play strategies, bet behaviors, and associated card count, and predict, utilizing the machine learning model, that a player of the one or more players is an advantage player implementing an advantage play strategy based on the analysis of the game play, the bets laid, and the card counts.

In some aspects, the computing device is further configured to generate a player profile for at least one of the one or more players identified in the image data, wherein the player profile includes biometric data determined from the image data for identifying the player from one or more other players.

In some aspects, the computing device is further configured to correlate a player profile with at least one of the one or more players identified in the image data, wherein the player profile includes player specific game play behavior and bet behavior determined in response to a prior prediction of advantage play activity by the player and wherein predicting the player of the one or more players is the advantage player further includes analyzing the player specific game play behavior and the bet behavior from a prior prediction of advantage play in combination with the game play and the bets laid by the player and the card counts associated with the game play and the bets laid by the player.

In some aspects, the player specific game play behavior and the bet behavior was determined from the player playing the card game at a different card table than a current table in which the player is playing the card game.

In some aspects, the player specific game play behavior and the bet behavior was determined from the player playing the card game on a different day than a current day in which the player is playing the card game.

In some aspects, the analysis of the game play, the bets laid, and the card counts includes computing a variance in a bet value of the bets laid relative to the game play and the card count.

In some aspects, the game play comprises the card information of the cards dealt to each of the one or more players.

In some aspects, the game play comprises information about how a player plays the cards that are dealt to the player in combination with the cards dealt to one or more other players.

In some aspects, the card information output by the one or more card shoes includes a value, a color, and a suit of a card dealt from the one or more card shoes.

In some aspects, the computing device is further configured to generate a notification when one of the one or more players is predicted to be the advantage player.

In some aspects, the computing device is further configured to delay the generation of the notification while a total winnings amount of the advantage player is less than a predetermined value.

Aspects of the present disclosure may also include a method for identifying and tracking an advantage player includes receiving a card information from one or more card shoes, wherein the one or more card shoes are configured to dispense playing cards and output the card information of the dispensed playing cards and receiving image data from one or more cameras positioned to capture image data of one or more players playing a card game. The method further includes tracking, with a computing device for a plurality of hands of cards dealt, game play and bets laid by the one or more players playing the card game, determining a card count associated with each of the plurality of hands of cards dealt, analyzing, utilizing a machine learning model, the game play and the bets laid by the one or more players and card counts associated with the game play and the bets laid by the one or more players, wherein the machine learning model is trained to predict the presence of advantage play strategies based on game play strategies, bet behaviors, and associated card count, and predicting, utilizing the machine learning model, that a player of the one or more players is an advantage player implementing an advantage play strategy based on the analysis of the game play, the bets laid, and the card counts.

In some aspects, the method further comprises generating a player profile for at least one of the one or more players identified in the image data, wherein the player profile includes biometric data determined from the image data for identifying the player from one or more other players.

In some aspects, the method further comprises correlating a player profile with at least one of the one or more players identified in the image data, wherein the player profile includes player specific game play behavior and bet behavior determined in response to a prior prediction of advantage play activity by the player, and wherein predicting the player of the one or more players is the advantage player further includes analyzing the player specific game play behavior and the bet behavior from a prior prediction of advantage play in combination with the game play and the bets laid by the player and the card counts associated with the game play and the bets laid by the player.

In some aspects, the player specific game play behavior and the bet behavior was determined from the player playing the card game at a different card table than a current table in which the player is playing the card game.

In some aspects, the player specific game play behavior and the bet behavior was determined from the player playing the card game on a different day than a current day in which the player is playing the card game.

In some aspects, the analysis of the game play, the bets laid, and the card counts includes computing a variance in a bet value of the bets laid relative to the game play and the card count.

In some aspects, the game play comprises the card information of the cards dealt to each of the one or more players.

In some aspects, the method further comprises generating a notification when one of the one or more players is predicted to be the advantage player.

In some aspects, the method further comprises delaying the generation of the notification while a total winnings amount of the advantage player is less than a predetermined value.

Accordingly it is understood that embodiments of the present disclosure include systems and methods of determining an advantage player by utilizing a combination of variance in play and variance in betting behavior along with a relative bet value to the card count. Some systems and methods include predicting whether an advantage player is detrimental to an establishment based on a predicted win/loss percentage for the player over time, optionally, across various games within the establishment, according to embodiments described herein.

Furthermore, some systems and methods include identifying a player based on game play and/or betting behavior, according to embodiments described herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An advantage player identification and tracking system, comprising:
   one or more card shoes configured to dispense playing cards and output card information of the dispensed playing cards;
   one or more cameras positioned to capture image data of one or more players playing a card game; and
   a computing device communicatively coupled to the one or more card shoes and the one or more cameras, the computing device configured to:
   receive the card information from the one or more card shoes,
   track, for a plurality of hands of cards dealt, game play and bets laid by the one or more players playing the card game,
   determine a card count associated with each of the plurality of hands of cards dealt,
   analyze, utilizing a machine learning model, the game play and the bets laid by the one or more players and card counts associated with the game play and the bets laid by the one or more players, wherein the machine learning model is trained to predict the presence of advantage play strategies based on game play strategies, bet behaviors, and associated card count, and
   predict, utilizing the machine learning model, that a player of the one or more players is an advantage player implementing an advantage play strategy based on the analysis of the game play, the bets laid, and the card counts.

2. The system of claim 1, wherein the computing device is further configured to:

generate a player profile for at least one of the one or more players identified in the image data, wherein the player profile includes biometric data determined from the image data for identifying the player from one or more other players.

3. The system of claim 1, wherein the computing device is further configured to:
correlate a player profile with at least one of the one or more players identified in the image data, wherein the player profile includes player specific game play behavior and bet behavior determined in response to a prior prediction of advantage play activity by the player and wherein predicting the player of the one or more players is the advantage player further includes analyzing the player specific game play behavior and the bet behavior from a prior prediction of advantage play in combination with the game play and the bets laid by the player and the card counts associated with the game play and the bets laid by the player.

4. The system of claim 3, wherein the player specific game play behavior and the bet behavior was determined from the player playing the card game at a different card table than a current table in which the player is playing the card game.

5. The system of claim 3, wherein the player specific game play behavior and the bet behavior was determined from the player playing the card game on a different day than a current day in which the player is playing the card game.

6. The system of claim 1, wherein the analysis of the game play, the bets laid, and the card counts includes computing a variance in a bet value of the bets laid relative to the game play and the card count.

7. The system of claim 1, wherein the game play comprises the card information of the cards dealt to each of the one or more players.

8. The system of claim 1, wherein the game play comprises information about how a player plays the cards that are dealt to the player in combination with the cards dealt to one or more other players.

9. The system of claim 1, wherein the card information output by the one or more card shoes includes a value, a color, and a suit of a card dealt from the one or more card shoes.

10. The system of claim 1, wherein the computing device is further configured to:
generate a notification when one of the one or more players is predicted to be the advantage player.

11. The system of claim 10, wherein the computing device is further configured to:
delay the generation of the notification while a total winnings amount of the advantage player is less than a predetermined value.

12. A method for identifying and tracking an advantage player, the method comprising:
receiving a card information from one or more card shoes, wherein the one or more card shoes are configured to dispense playing cards and output the card information of the dispensed playing cards;
receiving image data from one or more cameras positioned to capture image data of one or more players playing a card game;
tracking, with a computing device for a plurality of hands of cards dealt, game play and bets laid by the one or more players playing the card game,
determining a card count associated with each of the plurality of hands of cards dealt,
analyzing, utilizing a machine learning model, the game play and the bets laid by the one or more players and card counts associated with the game play and the bets laid by the one or more players, wherein the machine learning model is trained to predict the presence of advantage play strategies based on game play strategies, bet behaviors, and associated card count, and
predicting, utilizing the machine learning model, that a player of the one or more players is an advantage player implementing an advantage play strategy based on the analysis of the game play, the bets laid, and the card counts.

13. The method of claim 12, further comprising:
generating a player profile for at least one of the one or more players identified in the image data, wherein the player profile includes biometric data determined from the image data for identifying the player from one or more other players.

14. The method of claim 12, further comprising:
correlating a player profile with at least one of the one or more players identified in the image data, wherein the player profile includes player specific game play behavior and bet behavior determined in response to a prior prediction of advantage play activity by the player, and wherein predicting the player of the one or more players is the advantage player further includes analyzing the player specific game play behavior and the bet behavior from a prior prediction of advantage play in combination with the game play and the bets laid by the player and the card counts associated with the game play and the bets laid by the player.

15. The method of claim 14, wherein the player specific game play behavior and the bet behavior was determined from the player playing the card game at a different card table than a current table in which the player is playing the card game.

16. The method of claim 14, wherein the player specific game play behavior and the bet behavior was determined from the player playing the card game on a different day than a current day in which the player is playing the card game.

17. The method of claim 12, wherein the analysis of the game play, the bets laid, and the card counts includes computing a variance in a bet value of the bets laid relative to the game play and the card count.

18. The method of claim 12, wherein the game play comprises the card information of the cards dealt to each of the one or more players.

19. The method of claim 12, further comprising:
generating a notification when one of the one or more players is predicted to be the advantage player.

20. The method of claim 19, further comprising:
delaying the generation of the notification while a total winnings amount of the advantage player is less than a predetermined value.

* * * * *